United States Patent
Kurian et al.

(10) Patent No.: US 11,147,126 B2
(45) Date of Patent: Oct. 12, 2021

(54) NEIGHBOR AWARENESS NETWORKING DISCOVERY WINDOW CONGESTION MITIGATION

(71) Applicant: Apple Inc., Cupertino, CA (US)

(72) Inventors: Lawrie Kurian, San Jose, CA (US); Peter N. Heerboth, San Jose, CA (US); Yong Liu, Campbell, CA (US); Tashbeeb Haque, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/403,885

(22) Filed: May 6, 2019

(65) Prior Publication Data
US 2019/0357308 A1    Nov. 21, 2019

Related U.S. Application Data

(60) Provisional application No. 62/672,012, filed on May 15, 2018.

(51) Int. Cl.
| | |
|---|---|
| *H04W 88/10* | (2009.01) |
| *H04W 8/00* | (2009.01) |
| *H04W 4/70* | (2018.01) |
| *H04W 80/02* | (2009.01) |
| *H04W 72/04* | (2009.01) |
| *H04W 28/02* | (2009.01) |

(52) U.S. Cl.
CPC .............. *H04W 88/10* (2013.01); *H04W 4/70* (2018.02); *H04W 8/005* (2013.01); *H04W 28/0289* (2013.01); *H04W 72/0446* (2013.01); *H04W 80/02* (2013.01)

(58) Field of Classification Search
CPC .............................. H04W 8/005; H04L 67/16
See application file for complete search history.

(56) References Cited

U.S. PATENT DOCUMENTS

| | | | |
|---|---|---|---|
| 9,226,231 B2 | 12/2015 | Abraham | |
| 9,686,806 B2 | 6/2017 | Park | |
| 10,009,746 B2 | 6/2018 | Jung | |
| 10,091,640 B2 | 10/2018 | Park | |
| 2014/0211659 A1* | 7/2014 | Abraham | H04W 8/005 370/254 |
| 2016/0323925 A1 | 11/2016 | Alanen | |
| 2018/0027487 A1 | 1/2018 | Pang | |
| 2018/0152828 A1 | 5/2018 | Kasslin | |
| 2019/0007485 A1 | 1/2019 | Kim | |
| 2019/0150062 A1* | 5/2019 | Bradley | H04L 67/16 370/254 |

FOREIGN PATENT DOCUMENTS

WO    WO 2018/131296 A1    7/2018

* cited by examiner

*Primary Examiner* — Gregory B Sefcheck
*Assistant Examiner* — Debebe A Asefa
(74) *Attorney, Agent, or Firm* — Kowert, Hood, Munyon, Rankin & Goetzel, P.C.

(57) ABSTRACT

One or more wireless stations may operate to configure direct communication with neighboring mobile stations, e.g., direct communication between the wireless stations without utilizing an intermediate access point. A mechanism for wireless stations to mitigate medium congestion in discovery windows may include suppressing solicited publisher responses via an SRF for a first time period and resetting the SRF after the first time period in order to receive updates from peer devices.

20 Claims, 12 Drawing Sheets

| Field | Size (Octets) | Description |
|---|---|---|
| FC | 2 | Frame Control field |
| Duration | 2 | Duration value for the beacon frame |
| A1 | 6 | Broadcast Address |
| A2 | 6 | Transmitter MAC address |
| A3 | 6 | Cluster ID identifying the NAN cluster |
| Seq. Ctrl | 2 | Sequence Control field |
| Time Stamp | 8 | Time Stamp of the beacon frame |
| Beacon Interval | 2 | Time units between beacons |
| Capability | 2 | Capability information field |
| NAN IE | Variable | NAN information element |
| FCS | 4 | Frame checksum |

FIG. 4A

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| NAN attributes | Variable | One or more NAN attributes |

FIG. 4B

| Attributes | NAN SDF Frames ||||| 
|---|---|---|---|---|---|
| | Publish ||| Subscribe | Follow-up |
| | Data | Ranging | Otherwise | | |
| Master Indication | NO | NO | NO | NO | NO |
| Cluster | NO | NO | NO | NO | NO |
| Service ID List | NO | NO | NO | NO | NO |
| Service Descriptor | YES/M | YES/M | YES/M | YES/M | YES/M |
| NAN Con. Cap. | YES/O | YES/O | YES/O | YES/O | YES/O |
| WLAN Infra | YES/O | YES/O | YES/O | YES/O | YES/O |
| P2P Operation | YES/O | YES/O | YES/O | YES/O | YES/O |
| IBSS | YES/O | YES/O | YES/O | YES/O | YES/O |
| Mesh | YES/O | YES/O | YES/O | YES/O | YES/O |
| Further Service Dis | YES/O | YES/O | YES/O | YES/O | YES/O |
| Further Avail Map | YES/O | YES/O | YES/O | YES/O | YES/O |
| Country Code | YES/O | YES/O | YES/O | YES/O | YES/O |
| Ranging | YES/O | YES/O | YES/O | YES/O | YES/O |
| Cluster Discovery | NO | NO | NO | NO | NO |
| Service Desc. Ext | YES/M | YES/M | YES/O | YES/O | YES/O |
| Device Cap. | YES/M | YES/M | YES/O | YES/O | YES/O |
| NDP | NO | NO | NO | NO | NO |
| NAN Availability | YES/M | YES/M | YES/O | YES/O | YES/O |
| NDC | YES/O | YES/O | YES/O | YES/O | YES/O |
| NDL | NO | NO | NO | NO | NO |
| NDL QoS | NO | NO | NO | NO | NO |
| Unaligned Sched. | YES/O | YES/O | YES/O | YES/O | YES/O |
| Ranging Info. | NO | YES/M | NO | NO | YES/O |
| Ranging Setup | NO | NO | NO | NO | NO |
| FTM Rang. Rep. | NO | NO | NO | NO | NO |
| Element Container | YES/O | YES/O | YES/O | YES/O | YES/O |
| Ex. WLAN Infra. | YES/O | YES/O | YES/O | YES/O | YES/O |
| Ex. P2P Operation | YES/O | YES/O | YES/O | YES/O | YES/O |
| Ex. IBSS | YES/O | YES/O | YES/O | YES/O | YES/O |
| Ex. Mesh | YES/O | YES/O | YES/O | YES/O | YES/O |
| Cipher Suit Info. | YES/O | YES/O | YES/O | YES/O | YES/O |
| Security Con. Info. | YES/O | YES/O | YES/O | YES/O | YES/O |
| Shared-Key Desc. | NO | NO | NO | NO | NO |
| Public Availability | YES/O | YES/O | YES/O | YES/O | YES/O |
| Vendor Specific | YES/O | YES/O | YES/O | YES/O | YES/O |

*FIG. 4C*

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| OUI Subtype | 1 | Identifying type of NAN action frame |
| Information Content | variable | Fields and/or attributes for specific NAN action frames |

*FIG. 4D*

NEIGHBOR AWARENESS NETWORKING DISCOVERY WINDOW CONGESTION MITIGATION

PRIORITY DATA

This application claims benefit of priority to U.S. Provisional Application Ser. No. 62/672,012, titled "Neighbor Awareness Networking Discovery Window Congestion Mitigation", filed May 15, 2018, by Lawrie Kurian, Peter N. Heerboth, Yong Liu, and Tashbeeb Haque which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in the setup and coordination of the communication between such devices.

SUMMARY

Some embodiments described herein relate to systems and methods for peer wireless stations (e.g., wireless stations configured to communicate with neighboring wireless stations without utilizing an intermediate access point) to perform discovery window congestion mitigation.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with one or more neighboring mobile stations, e.g., direct communication between the wireless stations without utilizing an intermediate access point. Embodiments of the disclosure relate to a mechanism for peer devices to mitigate discovery window congestion.

In some embodiments, the communications may be performed via a peer-to-peer wireless communications protocol, such as Neighbor Awareness Networking (NAN). Thus, embodiments of the disclosure also relate to NAN devices mitigating NAN discovery window congestion.

In some embodiments, a wireless station may be configured to transmit, in a first discovery window, a subscriber service discovery frame (SDF) to one or more neighboring wireless stations and receive, in the first discovery window, one or more solicited publisher SDFs from the one or more neighboring wireless stations. In some embodiments, based on the one or more solicited publisher SDFs, a service response filter (SRF) may be determined. The service response filter may be a list of MAC addresses of publishing devices that responded (e.g., transmitted a publisher SDF) to the wireless station and/or a Bloom filter of the list of MAC addresses of publishing devices that responded to the wireless station. The wireless station may be further configured to transmit, in a subsequent second discovery window, the SRF in a subscriber SDF to the one or more neighboring wireless stations (e.g., the publishing devices that responded to the wireless station) and the SRF may indicate that the one or more neighboring wireless stations are to suppress responses (e.g., not respond with additional solicited publisher SDFs) to the subscriber SDF. Additionally, subsequent to the second discovery window and after a specified period of time, the SRF may be reset (e.g., the contents of the SRF may be deleted and/or cleared), thereby generating a reset SRF. The reset SRF may be transmitted in a third discovery window after the specified period of time to the one or more neighboring wireless devices. In other words, the reset SRF may be transmitted in a next available discovery window after the specified period of time lapses. In addition, one or more solicited publisher SDFs may be received from at least one of the one or more neighboring wireless devices in a fourth discovery window subsequent to the third discovery window.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example format of a synchronization/discovery beacon frame, according to some embodiments.

FIG. 4B illustrates an example format of a service discovery frame (SDF), according to some embodiments.

FIG. 4C illustrates an example format of a NAN attribute field, according to some embodiments.

FIG. 4D illustrates an example format of an action frame, according to some embodiments.

Figure 1:
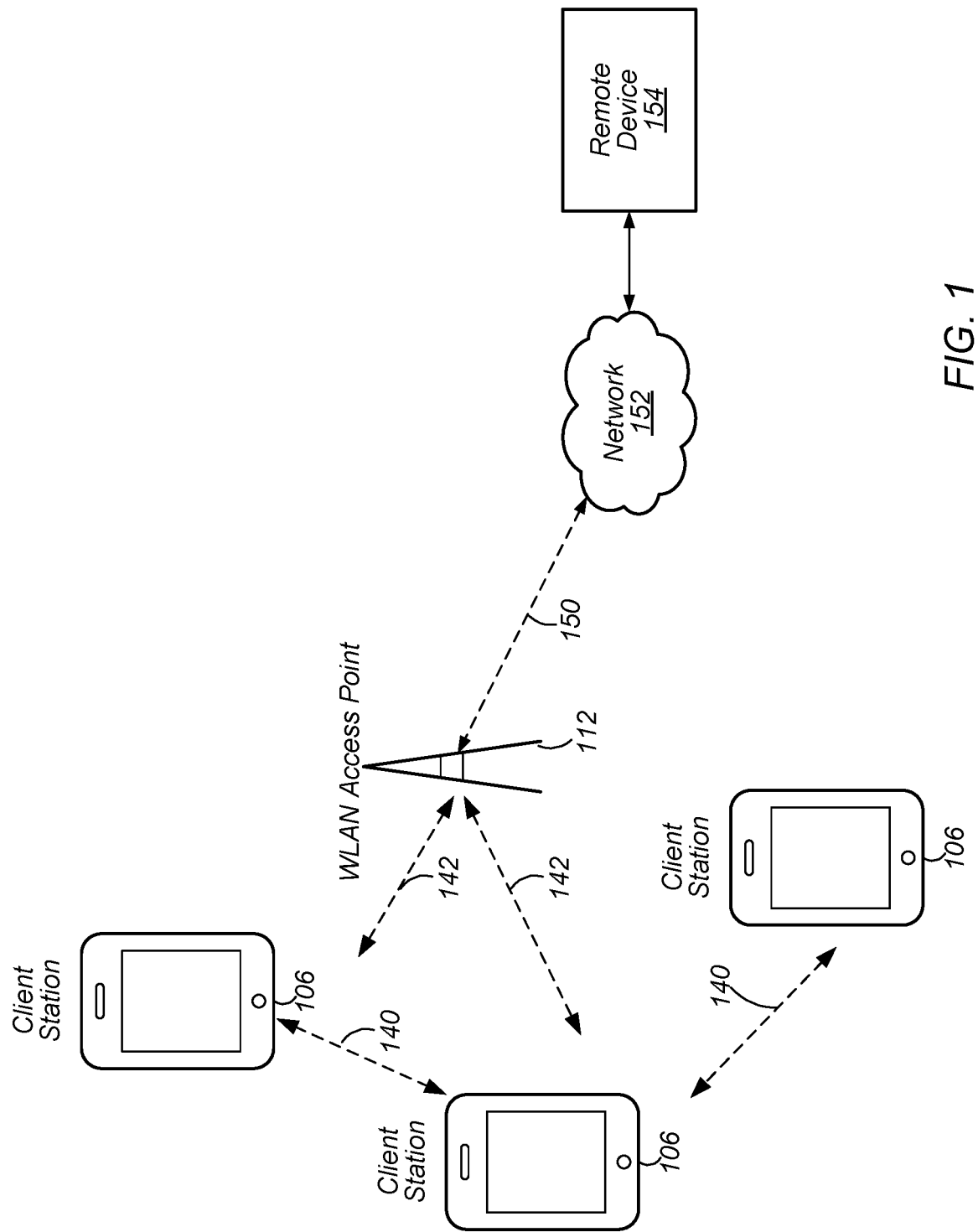
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to transmit, in a first discovery window, a subscriber service discovery frame (SDF) to one or more neighboring wireless devices and receive, in the first discovery window, one or more solicited publisher SDFs from the one or more neighboring wireless devices. In some embodiments, based on the one or more solicited publisher SDFs, a service response filter (SRF) may be determined. The service response filter may be a list of MAC addresses of publishing devices that responded (e.g., transmitted a publisher SDF) to the wireless device 106 and/or a Bloom filter of the list of MAC addresses of publishing devices that responded to the wireless device 106. The wireless device 106 may be further configured to transmit, in a subsequent second discovery window, the SRF in a subscriber SDF to the one or more neighboring wireless devices (e.g., the publishing devices that responded to the wireless device 106) and the SRF may indicate that the one or more neighboring wireless devices are to suppress responses (e.g., not respond with additional solicited publisher SDFs) to the subscriber SDF. Additionally, subsequent to the second discovery window and after a specified period of time, the SRF may be reset (e.g., the contents of the SRF may be deleted and/or cleared), thereby generating a reset SRF. The reset SRF may be transmitted in a third discovery window after the specified period of time to the one or more neighboring wireless devices. In other words, the reset SRF may be transmitted in a next available discovery window after the specified period of time lapses. In addition, one or more solicited publisher SDFs may be received from at least one of the one or more neighboring wireless devices in a fourth discovery window subsequent to the third discovery window.

Figure 2:
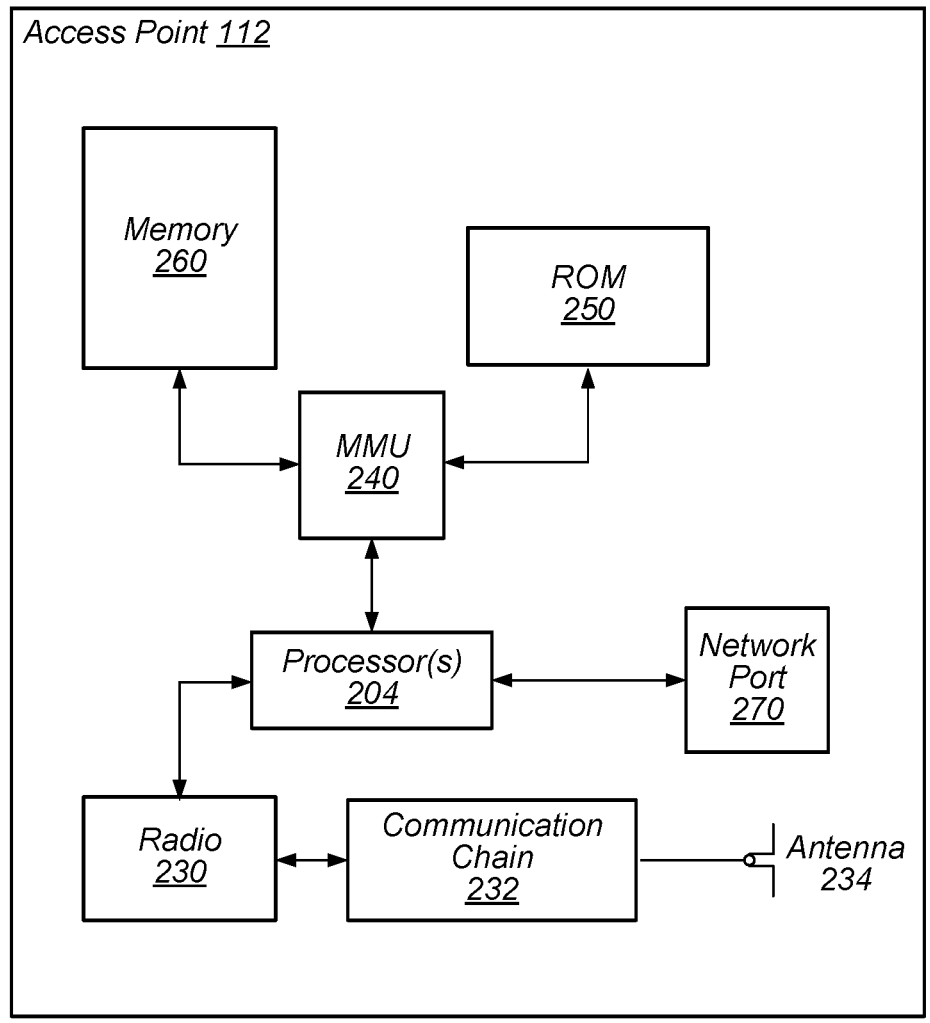
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 that may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to transmit, in a first discovery window, a subscriber service discovery frame (SDF) to one or more neighboring wireless devices and receive, in the first discovery window, one or more solicited publisher SDFs from the one or more neighboring wireless devices. In some embodiments, based on the one or more solicited publisher SDFs, a service response filter (SRF) may be determined. The service response filter may be a list of MAC addresses of publishing devices that responded (e.g., transmitted a publisher SDF) to the AP 112 and/or a Bloom filter of the list of MAC addresses of publishing devices that responded to the AP 112. The AP 112 may be further configured to transmit, in a subsequent second discovery window, the SRF in a subscriber SDF to the one or more neighboring wireless devices (e.g., the publishing devices that responded to the AP 112) and the SRF may indicate that the one or more neighboring wireless devices are to suppress responses (e.g., not respond with additional solicited publisher SDFs) to the subscriber SDF. Additionally, subsequent to the second discovery window and after a specified period of time, the SRF may be reset (e.g., the contents of the SRF may be deleted and/or cleared), thereby generating a reset SRF. The reset SRF may be transmitted in a third discovery window after the specified period of time to the one or more neighboring wireless devices. In other words, the reset SRF may be transmitted in a next available discovery window after the specified period of time lapses. In addition, one or more solicited publisher SDFs may be received from at least one of the one or more neighboring wireless devices in a fourth discovery window subsequent to the third discovery window.

Figure 3:
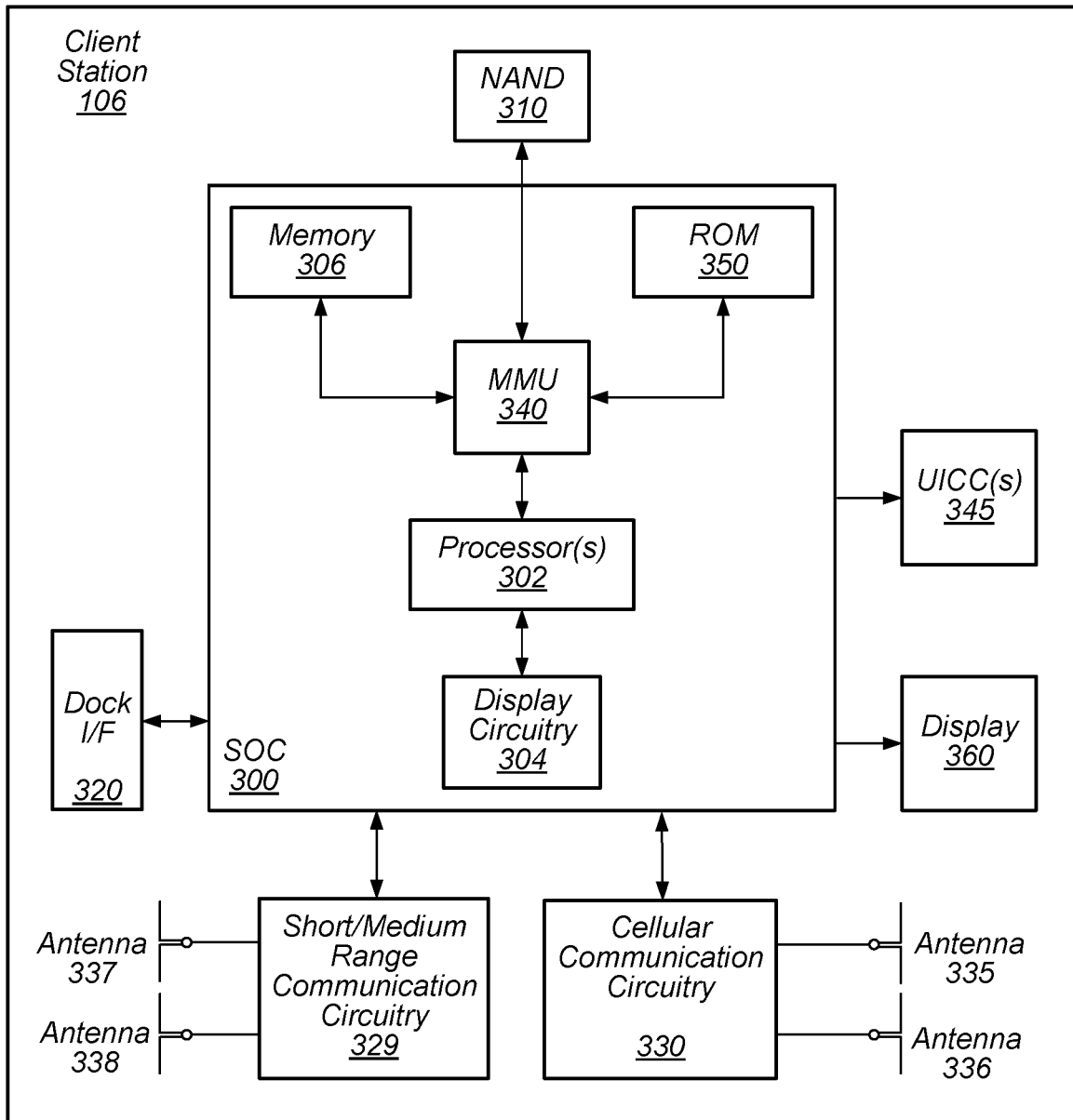
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to transmit, in a first discovery window, a subscriber service discovery frame (SDF) to one or more neighboring wireless devices and receive, in the first discovery window, one or more solicited publisher SDFs from the one or more neighboring wireless devices. In some embodiments, based on the one or more solicited publisher SDFs, a service response filter (SRF) may be determined. The service response filter may be a list of MAC addresses of publishing devices that responded (e.g., transmitted a publisher SDF) to the client station 106 and/or a Bloom filter of the list of MAC addresses of publishing devices that responded to the client station 106. The client station 106 may be further configured to transmit, in a subsequent second discovery window, the SRF in a subscriber SDF to the one or more neighboring wireless devices (e.g., the publishing devices that responded to the client station 106) and the SRF may indicate that the one or more neighboring wireless devices are to suppress responses (e.g., not respond with additional solicited publisher SDFs) to the subscriber SDF. Additionally, subsequent to the second discovery window and after a specified period of time, the SRF may be reset (e.g., the contents of the SRF may be deleted and/or cleared), thereby generating a reset SRF. The reset SRF may be transmitted in a third discovery window after the specified period of time to the one or more neighboring wireless devices. In other words, the reset SRF may be transmitted in a next available discovery window after the specified period of time lapses. In addition, one or more solicited publisher SDFs may be received from at least one of the one or more neighboring wireless devices in a fourth discovery window subsequent to the third discovery window.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Peer-to-Peer Frame Formats

In some embodiments, Wi-Fi devices (e.g., client station 106) may be able to communicate with each other in a peer to peer manner, e.g., without the communications going through an intervening access point. In some embodiments, devices may exchange one or more management frames, e.g., such as synchronization/discovery beacon frames, service discovery frames (SDFs), and/or action frames, in order to synchronize, advertise, solicit, and/or negotiate a peer-to-peer data session, such as a NAN datapath and/or a NAN datalink. In some embodiments, particular management frame formats (e.g., synchronization/discovery beacon frame formats, SDF formats, and/or action frame formats) may be implemented to transport information associated with embodiments disclosed herein.

For example, as illustrated by FIG. 4A, a synchronization/discovery beacon frame format (e.g., as specified by NAN 2.0 and later versions of NAN) may include fields such as a frame control (FC) filed, a duration field, multiple address fields (e.g., A1-A3), a sequence control field, a time stamp field, a beacon interval field, a capability information field, a NAN information element (IE) field, and/or a frame checksum (FCS) field. The frame control field, duration field, sequence control field, time stamp field, beacon interval field, capability field, and FCS field may be defined by IEEE 802.11. Note that for synchronization beacons, the beacon interval field may be set to 512 TUs, which may correspond to a time interval between consecutive starts of discovery windows. In addition, for discovery beacons, the beacon interval field may be set to 100 TUs, which may correspond to an average time between consecutive discovery beacon transmissions by a device in a master role. Addresses may include a broadcast address (A1), a transmitter medium access control (MAC) address (A2), and a cluster identifier address (A3). In some embodiments, the NAN IE may be vendor specific and may be configured to transport information associated with embodiments disclosed herein.

As another example, as illustrated by FIG. 4B, a service discovery frame format (e.g., as specified by NAN 2.0 and later versions of NAN) may include one or more fields, including a category field, an action field, an organizationally unique identifier (OUI) field, an OUI type field, and/or a NAN attributes field. In some embodiments, information associated with embodiments disclosed herein may be transported via the NAN attributes field. In some embodiments, information associated with embodiments disclosed herein may be transported via the OUI field and/or the OUI type field.

Further, as illustrated by FIG. 4C, the NAN attribute field (e.g., as specified by NAN 2.0 and later versions of NAN) includes multiple fields that may be used to implement features of embodiments disclosed herein. For example, in some embodiments, information associated with embodiments disclosed herein may be transported via any of (or any combination of) attributes included in the NAN attribute field. For example, in some embodiments, the vendor specific attribute may be used to transport information associated with embodiments disclosed herein. As another example, the further availability map attribute may be used to transport information associated with embodiments disclosed herein. As shown, the NAN attribute field may contain (or included) different attributes based on a type of NAN SDF frame. For example, a publisher SDF frame for data transmission may include both mandatory (M) and optional (O) attributes that differ from a publisher SDF frame for ranging and/or other purposes (e.g., "Otherwise"). Similarly, a subscriber SDF frame may include differing attributes as compared to a follow-up SDF and/or the various publisher SDF frames. Thus, as a further example, various configurations of a NAN attribute may be used to transport information associated with embodiments disclosed herein.

As yet a further example, as illustrated by FIG. 4D, an action frame format (e.g., as specified by NAN 2.0 and later versions of NAN) may include one or more fields, including a category field, an action field, an OUI field, an OUI type field, an OUI subtype field and/or an information content field. In some embodiments, information associated with embodiments disclosed herein may be transported via the information content field. In some embodiments, information associated with embodiments disclosed herein may be transported via the OUI field, the OUI type field, and/or the OUI subtype field.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). The NAN protocol also may incorporate additional aspects. NAN 1.0 describes methods for NAN protocol synchronization and discovery. After two wireless stations have discovered each other (per NAN 1.0) they may implement a procedure to setup a NAN datapath between them so that they can communicate. After this, the two wireless stations arrange for a common datapath negotiation window so that they can negotiate capabilities, synchronization requirements, and/or exchange further service information (e.g., per NAN 2.0). The datapath negotiation window is a time window that enables two wireless stations to communicate with each other so that they can negotiate capabilities and/or synchronization requirements, and exchange further service information. Once the datapath negotiation window has been established and NAN datapath setup has been performed, the wireless stations may perform datapath synchronization to help ensure that the two stations stay synchronized with each other for communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods (and/or mechanisms) for a wireless station (including, but not limited to, a NAN device) to mitigate congestion in discovery windows.

Discovery Window Congestion Mitigation

Figure 5:
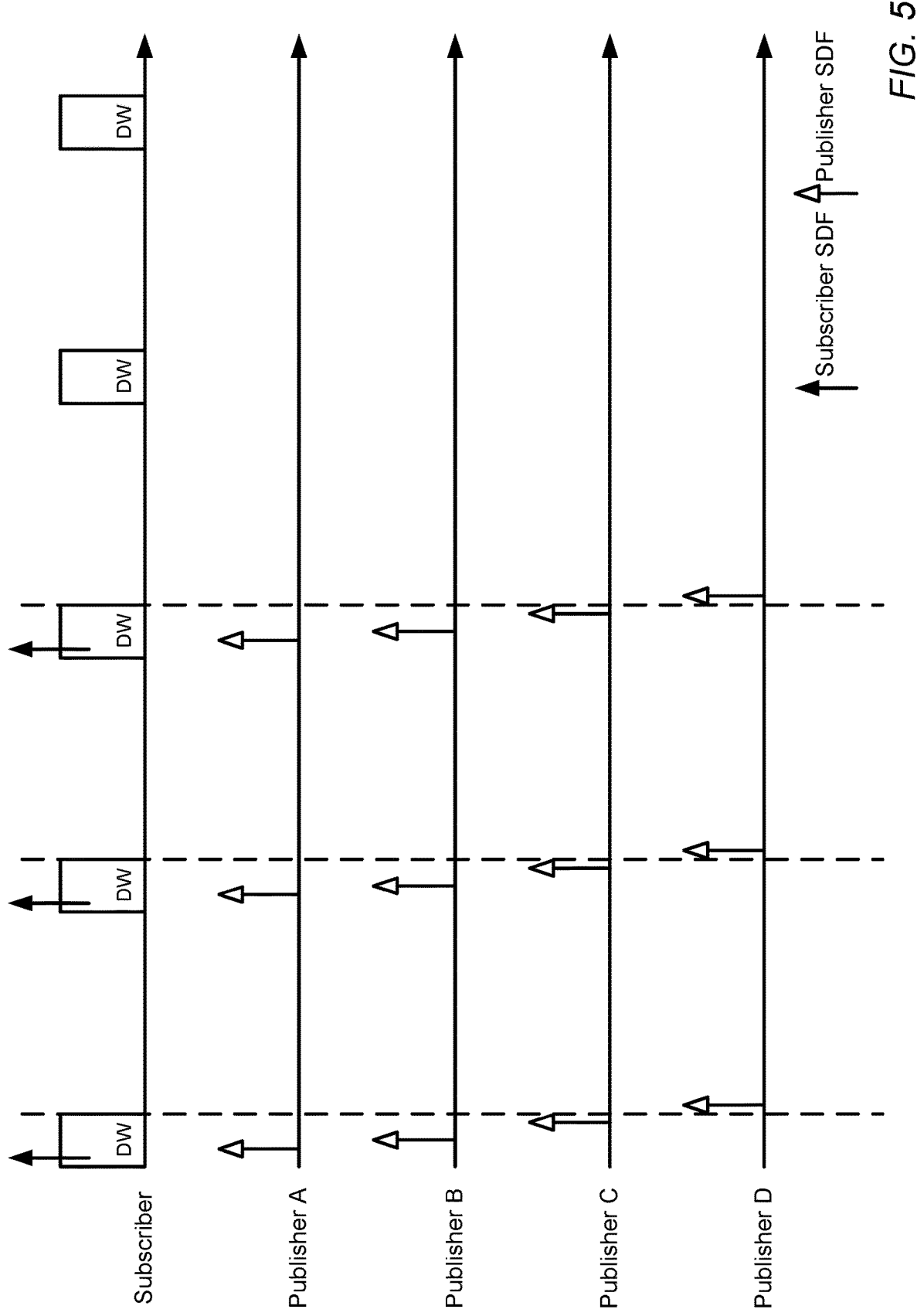
FIG. 5 illustrates an example of discovery window congestion.

In current implementations, publishing devices (e.g., publishing NAN devices) may respond back to subscribing devices (e.g., subscribing NAN devices) in a discovery window when there is a service match. In other words, multiple devices may be contending for medium access during a limited time period, such as a discovery window, which is typically 16 TUs, where a TU is 1024 microseconds (1.024 milliseconds). Thus, discovery windows may become congested. For example, as illustrated by FIG. 5, a subscriber may initially transmit a subscribe service discovery frame (SDF) at the beginning of a discovery window. In addition, publishers A-D may each need to transmit a response (e.g., a solicited publisher SDF) during the discovery window. However, due to congestion, publisher D may be unable to transmit a response during the discovery window.

Figure 6:
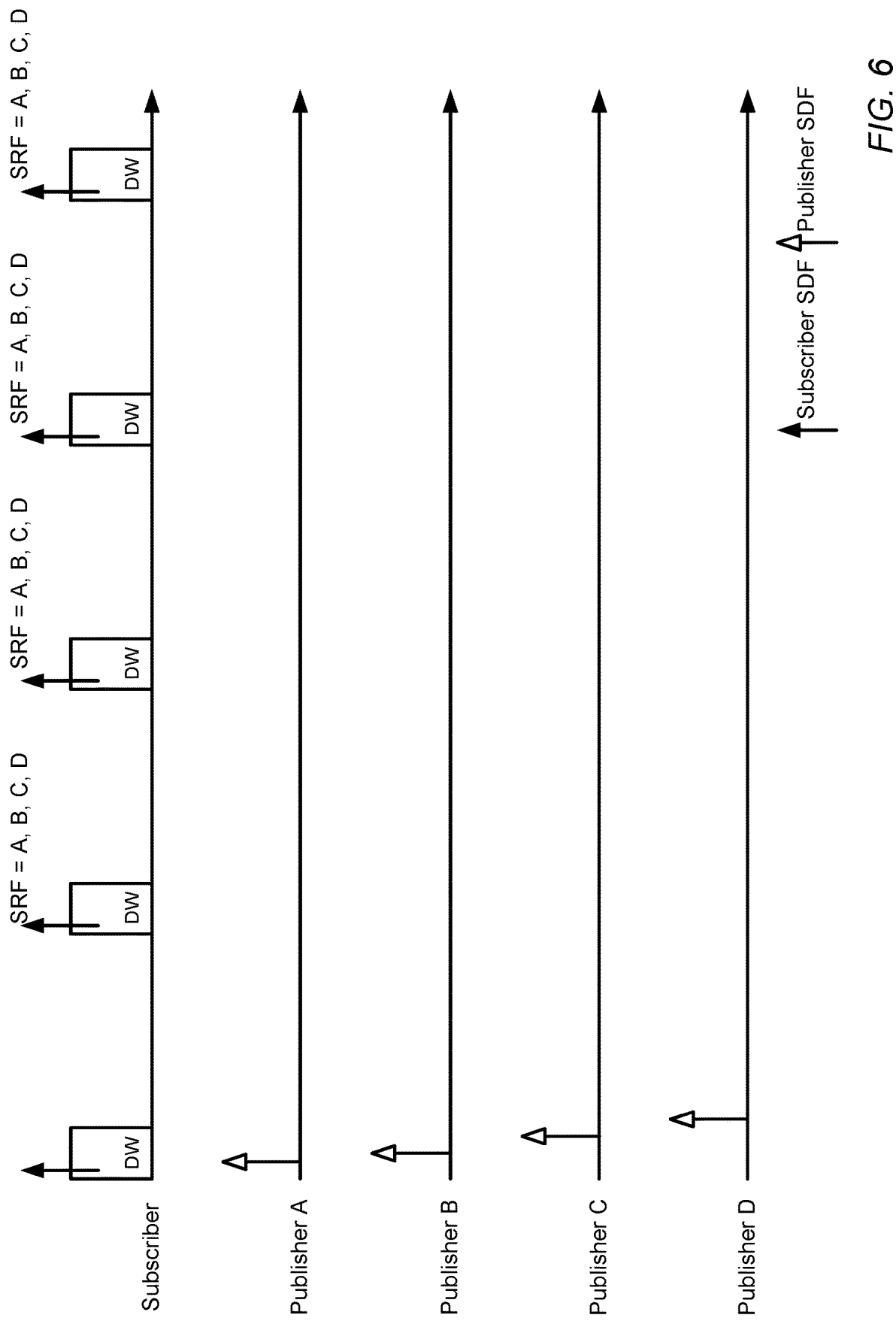
FIG. 6 illustrates an example of a service response filter to mitigate discovery window congestion.

Further, in some implementations, a service response filter (SRF) may be implemented by a subscribing device, e.g., as illustrated by FIG. 6. The SRF may contain a medium access control (MAC) address list or Bloom filter of the MAC addresses of publishing devices for which the subscribing device has received a publisher SDF. The SRF may be included in subsequent subscriber SDFs transmitted at the beginning of discovery windows. Then, when a publishing device receives the SRF, the publishing device may not respond (e.g., transmit a solicited publisher SDF) if it determines its MAC address is included in the SRF. In addition, to further reduce congestion a subscriber may back off SDF transmissions after a configured interval in a telescopic manner, e.g., one discovery window, then two discovery windows, then four discovery windows, then eight discovery windows, in a repeating manner. In other words, after waiting eight discovery windows, the subscribing device may return to the beginning of the telescopic interval.

Figure 7:
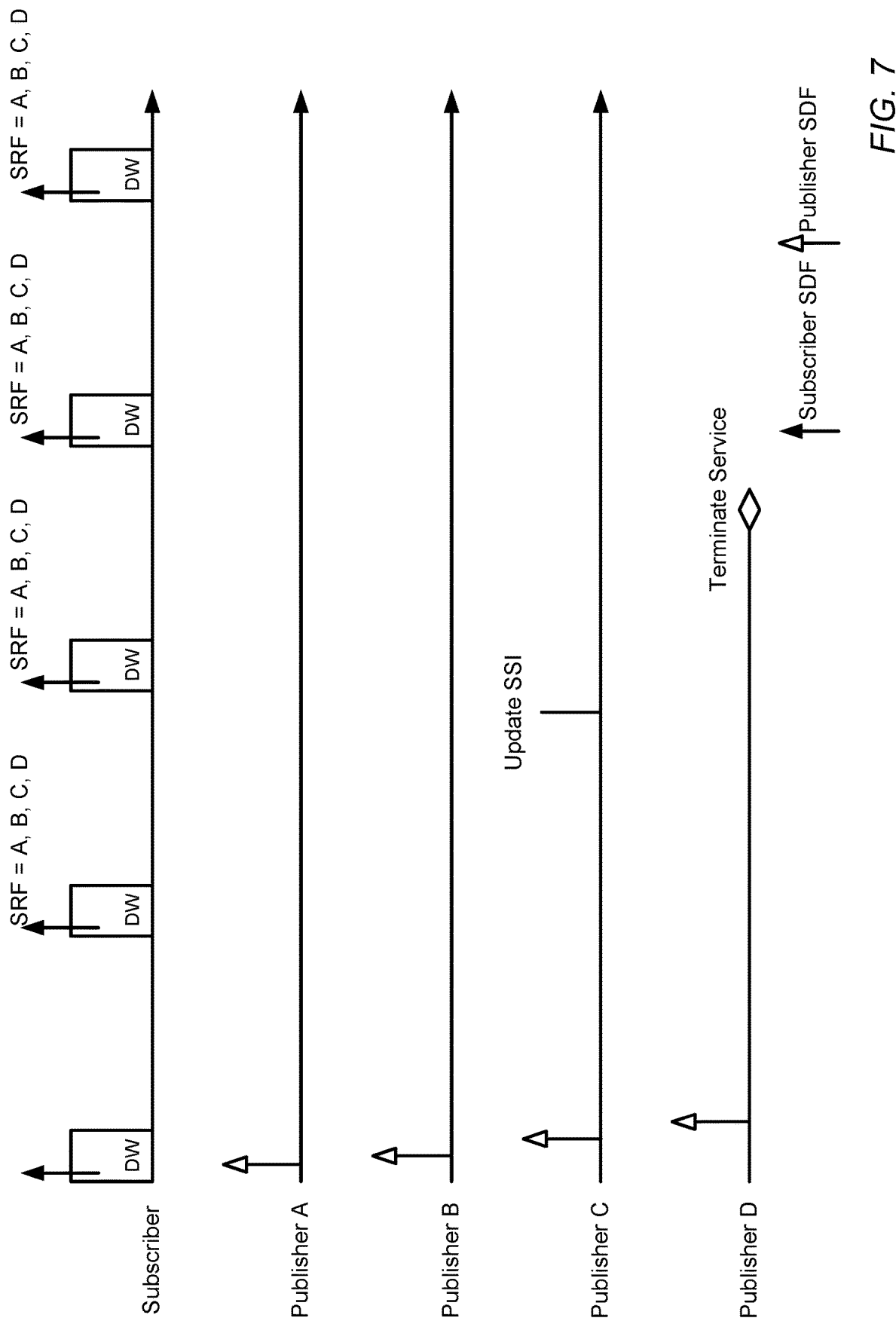
FIG. 7 illustrates an example of a service response filter muting a publisher's updated SSI.

However, as illustrated by FIG. 7, since a publisher may not respond due to the SRF, a subscriber may not be able to discover a publisher's updated service specific information (SSI). For example, as shown in FIG. 7, publisher C may not respond to the subscriber after publisher C has updated SSI. Similarly, since a publisher may not response due to the SRF, the subscriber may not receive publisher SDFs and thus may be unaware that a particular publisher has terminated a service. For example, as shown in FIG. 7, publisher D may terminate a service, however, the subscriber may be unaware of the termination since the subscriber is not expecting a response from publisher D due to the SRF.

Figure 8:
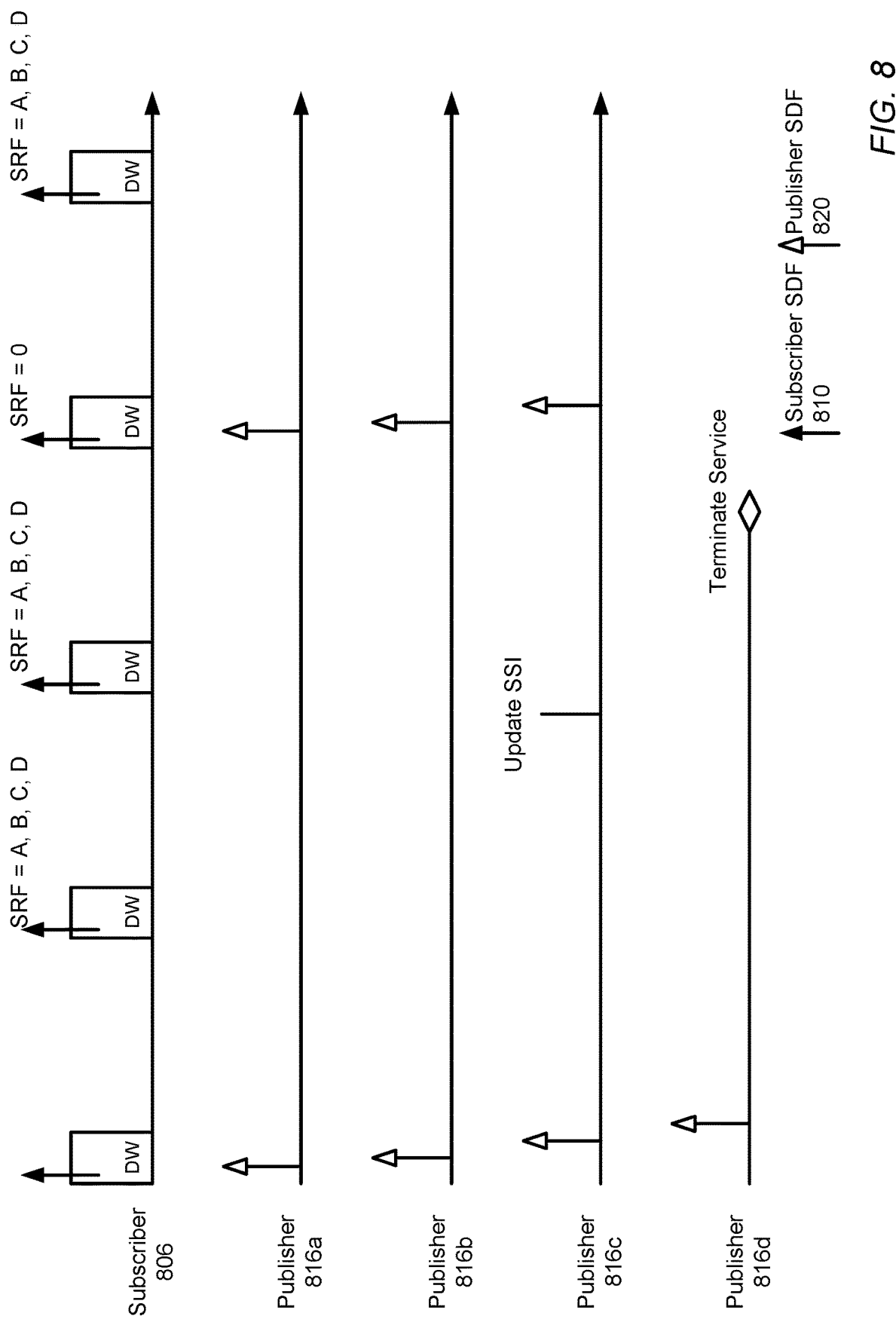
FIG. 8 illustrates an example of a subscriber resetting a service response filter to trigger responses from publishing devices, according to some embodiments.

Thus, in some embodiments, a subscriber 806 (e.g., such as client station 106) may periodically reset the SRF, e.g., after a configurable and/or specified period of time. For example, as illustrated by FIG. 8, after a period of time (e.g., at least two discovery window intervals), the subscriber 806 may reset the SRF. Note that in some embodiments, a discovery window interval may be defined as a number of time units (e.g., 512 time units) between discovery windows. In some embodiments, a discovery window interval may be defined as a number of time slots between discovery windows, where a duration of a time slot may be 16 time units. In some embodiments, a discovery window interval may be defined as a number of time blocks between discovery windows, where a duration of a time block may be 8 time slots.

In some embodiments, once the SRF is reset, publisher's 816*a*, 816*b*, and 816*c* (which may be client stations 106) may send publisher SDFs 820 to the subscriber 806. In the case of publisher 816*c*, the publisher SDF 820 may include an update to SSI. Further, since the subscriber 806 may expect a publisher SDF 820 from publisher 816*d* as well, the subscriber 806 may determine the absence of publisher 816*d* after the discovery window and may determine publisher 816*d* has terminated its service. Thus, as shown, after resetting the SRF, the subscriber 806 may include a new SRF in subscriber SDF 810.

Figure 9:
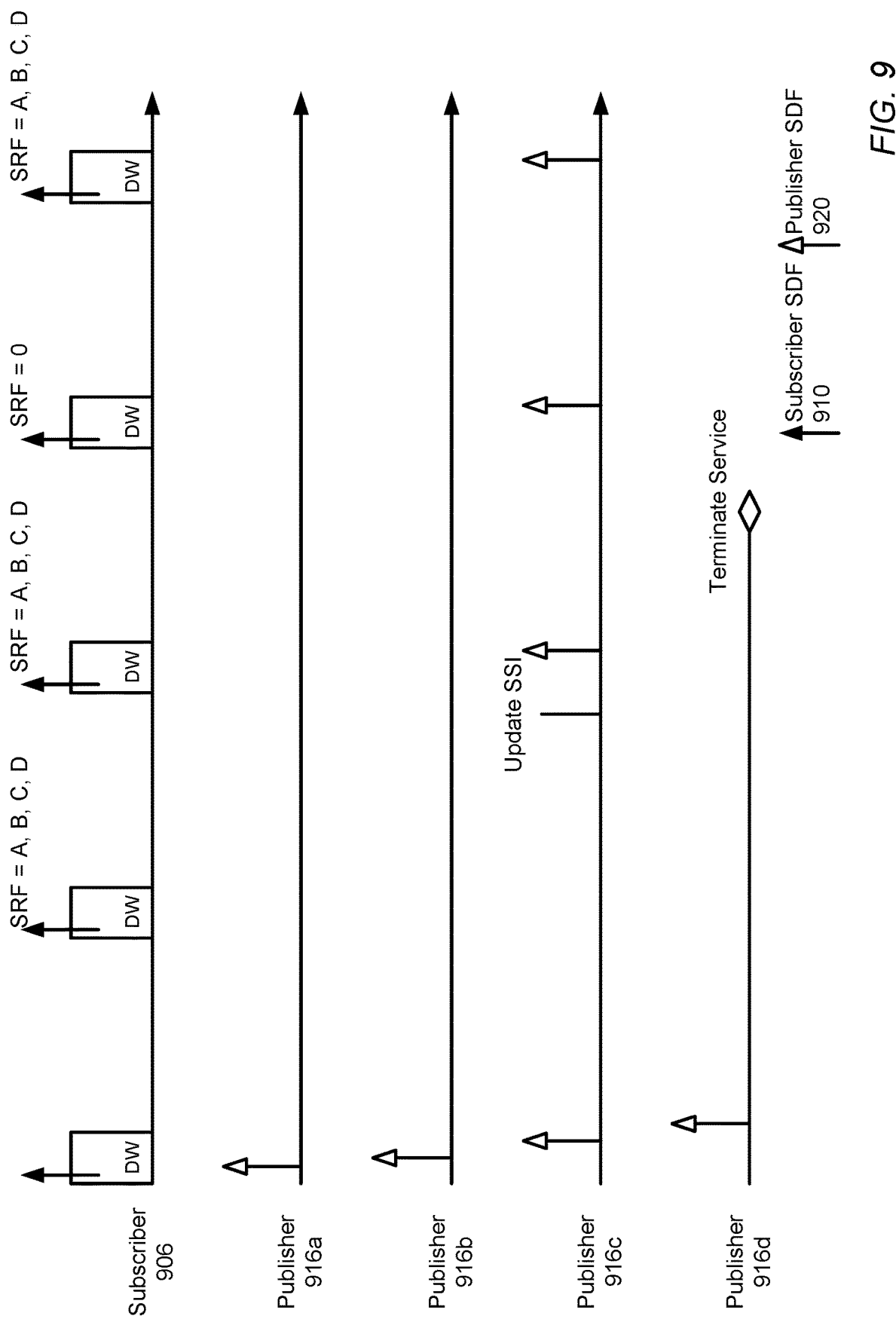
FIG. 9 illustrates an example of a publisher transmitting an unsolicited publish to notify a subscriber of updated SSI, according to some embodiments.

Further, in some embodiments, a publishing device 916*c* (e.g., such as client station 106) may enable an unsolicited publisher SDF 920 transmission for a specified and/or configured period of time subsequent to updating SSI. In addition, the publishing device 916*c* may increment a service update indicator in the unsolicited publisher SDF 920. Note that the unsolicited publisher SDF 920 may be received by the subscribing device 906 despite the SRF included in subscriber SDF 910. For example, as illustrated by FIG. 9, a subscriber 906 may, after a first discovery window, set an SRF to include publishers 916*a*, 916*b*, 916*c*, and 916*d*. Thus, publisher 916*c* may not transmit a publisher SDF 920 in a subsequent discovery window. However, publisher 916*c* may update SSI for its service and, in the next discovery window, transmit, to the subscriber 906 an unsolicited publisher SDF 920, thereby updating the subscriber 906 of the update to the SSI.

Figure 10:
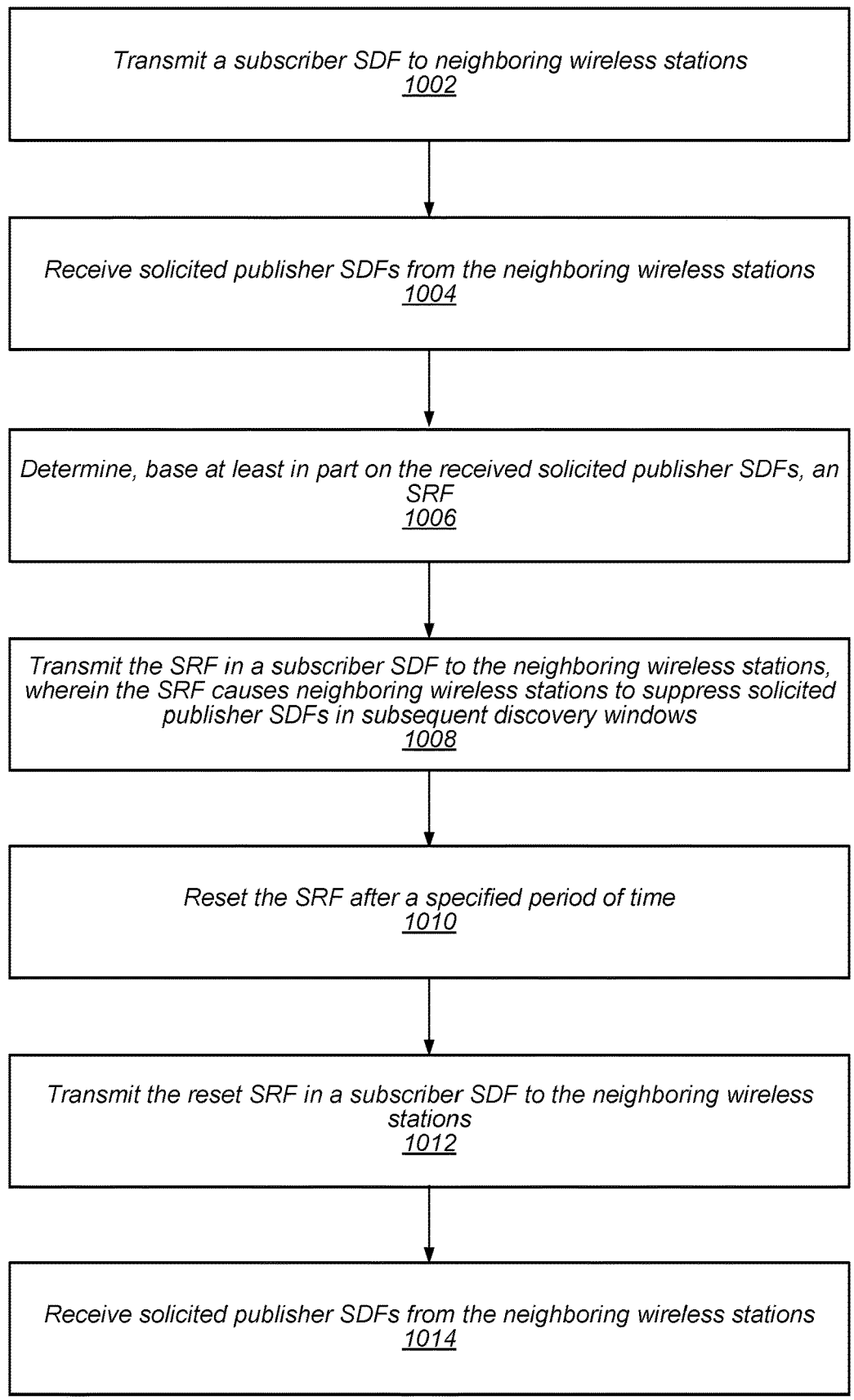
FIG. 10 illustrates a block diagram of an example of a method for discovery window congestion mitigation, according to some embodiments.

FIG. 10 illustrates a block diagram of an example of a method for discovery window congestion mitigation, according to some embodiments. The method shown in FIG. 10 may be used in conjunction with any of the systems or devices shown in the above Figures, among other devices. For example, a processor and/or processing element of a device shown in the above Figures may be configured to implement the method shown in FIG. 10. In various embodiments, some of the method elements shown may be performed concurrently, in a different order than shown, or may be omitted. Additional method elements may also be performed as desired. As shown, this method may operate as follows.

At 1002, a subscriber service discovery frame (SDF) may be transmitted (and/or broadcasted) to neighboring wireless stations, e.g., in a peer-to-peer manner. In some embodiments, the subscriber SDF may be transmitted at a start of a service discovery window (DW) or at a start of a discovery window (DW). In some embodiments, the subscriber SDF may be transmitted according to a peer-to-peer transmission protocol, such as NAN.

At 1004, solicited publisher SDFs may be received from at least one of the neighboring wireless stations, e.g., in a peer-to-peer manner. In some embodiments, the publisher SDFs may be received during the discovery window and/or a subsequent discovery window.

At 1006, a service response filter (SRF) may be determined based, at least in part, on the received solicited publisher SDFs. In some embodiments, the SRF may include (or comprise) a data structure indicating medium access control (MAC) addresses of the neighboring wireless stations. In some embodiments, the data structure may include (or comprise) a Bloom filter of the MAC addresses. In some embodiments, the data structure may include (or comprise) a list of the MAC addresses.

At 1008, the SRF may be included in a subscriber SDF transmitted (and/or broadcasted) to the neighboring wireless stations, e.g., in a peer-to-peer manner. The SRF included in the subscriber SDF may cause the neighboring wireless stations, upon receipt of the subscriber SDF, to suppress subsequent solicited publisher SDFs in subsequent discovery windows. In some embodiments, the SRF included in the subscriber SDF may be transmitted in a discovery window after receipt of the solicited publisher SDFs. In other words, the SRF may indicate that the neighboring wireless stations are to suppress responses (e.g., not respond with additional solicited publisher SDFs) to the subscribe SDF in subsequent discovery windows, e.g., at least for a specified period of time and/or until an SDF with an SRF that does not include an indication of the neighboring wireless station is received. In some embodiments, such suppression may reduce and/or mitigate congestion within subsequent discovery windows.

At 1010, the SRF may be reset (e.g., the contents of the SRF may be deleted and/or cleared), e.g., after a specified (and/or configured) period of time. In some embodiments, the specified period of time may be at least two discovery window intervals. In some embodiments, a discovery window interval may be defined as a number of time units between discovery windows. In some embodiments, the number of time units may 512 time units. In some embodiments, a discovery window interval may be defined as a number of time slots between discovery windows, where a duration of a time slot may be 16 time units. In some embodiments, a discovery window interval may be defined as a number of time blocks between discovery windows, where a duration of a time block may be 8 time slots.

At 1012, the reset SRF may be included in a subscriber SDF transmitted (and/or broadcasted) to the neighboring wireless stations, e.g., in a peer-to-peer manner. The reset SRF included in the subscriber SDF may cause the neighboring wireless stations, upon receipt of the subscriber SDF, to transmit a subsequent solicited publisher SDF in a subsequent discovery window.

At 1014, solicited publisher SDFs may be received from the neighboring wireless stations, e.g., in a peer-to-peer manner. In some embodiments, at least one of the solicited publisher SDFs may include service specific information (SSI) indicating an update (and/or cancellation) of a service provide by a neighboring wireless station.

In some embodiments, an unsolicited publisher SDF may be received from at least one of the neighboring wireless station in a subsequent discovery window. In some embodiments, a MAC address of the at least one neighboring wireless station may have been indicated by the SRF. In some embodiments, the unsolicited publisher SDF may include (or comprise) an update to service specific information (SSI) associated with a service provided by the at least one neighboring wireless station. In some embodiments, the unsolicited publisher SDF may additionally (or further) include (or comprise) an incremented service update indicator.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform communications via a Wi-Fi interface; and
   at least one processor in communication with the at least one radio;
   wherein the at least one processor is configured to cause the wireless station to:
      transmit, in a first discovery window, a first subscriber service discovery frame (SDF) to one or more neighboring wireless stations, wherein the first subscriber SDF is transmitted according to a peer-to-peer transmission protocol;
      receive, in the first discovery window, one or more first solicited publisher SDFs from at least one of the one or more neighboring wireless stations;
      transmit in a second subscriber SDF, during a subsequent second discovery window, a first service response filter (SRF) to the one or more neighboring wireless stations, wherein the first SRF is determined at least in part on the one or more received first solicited publisher SDFs, and wherein the first SRF indicates that the one or more neighboring wireless stations are to suppress responses to the second subscriber SDF in one or more subsequent discovery windows;
      reset contents of the first SRF, subsequent to the second discovery window and after a specified period of time following transmission of the second subscriber SDF, thereby generating a second SRF;
      transmit in a third subscriber SDF, during a third discovery window after the specified period of time, the second SRF to the one or more neighboring wireless stations, wherein the second SRF indicates that the one or more neighboring wireless stations are to respond to the third subscriber SDF; and
      receive, in a fourth discovery window subsequent to the third discovery window, one or more second solicited publisher SDFs from at least one of the one or more neighboring wireless stations.

2. The wireless station of claim 1,
   wherein the first SRF comprises a data structure indicating a medium access control (MAC) address of at least one of the one or more neighboring wireless stations.

3. The wireless station of claim 2,
   wherein the data structure comprises a Bloom filter representing one or more of the MAC addresses.

4. The wireless station of claim 2,
   wherein the data structure comprises a list of one or more of the MAC addresses.

5. The wireless station of claim 1,
   wherein the at least one processor is further configured to cause the wireless station to:
      receive, from at least one neighboring wireless station of the one or more neighboring wireless stations, an unsolicited publisher SDF in a subsequent discovery window, wherein a MAC address of the at least one neighboring wireless station is indicated by the first SRF.

6. The wireless station of claim 5,
   wherein the unsolicited publisher SDF includes an update to service specific information.

7. The wireless station of claim 6,
   wherein the unsolicited publisher SDF further includes an incremented service update indicator.

8. The wireless station of claim 1,
   wherein the specified period of time comprises at least two discovery window intervals.

9. The wireless station of claim 8,
   wherein a discovery window interval is defined by at least one of:
      a number of time units between successive discovery windows;
      a number of time slots between successive discovery windows, wherein a time slot represents a number of time units; or
      a number of time blocks between successive discovery windows, wherein a time block represents a number of time slots, and wherein a number of time slots represents a number of time units.

10. An apparatus, comprising:
    a memory; and
    at least one processor in communication with the memory, wherein the at least one processor is configured to:
       receive, in a first discovery window, one or more first solicited publisher SDFs from one or more neighboring wireless stations, wherein the one or more first solicited publisher SDFS are received subsequent to a first subscriber SDF transmitted at a start of the first discovery window;
       generate instructions to cause transmission, during a subsequent second discovery window, of a first service response filter (SRF) in a second subscriber SDF, wherein the first SRF is determined at least in part on the one or more received first solicited publisher SDFs, and wherein the first SRF indicates that the one or more neighboring wireless stations are to suppress responses to the second subscriber SDF in one or more subsequent discovery windows;
       generate instructions to cause transmission, during a third discovery window after a specified period of time following transmission of the second subscriber SDF, of a second SRF in a third subscriber SDF, wherein the second SRF indicates that the one or more neighboring wireless stations are to respond to the third subscriber SDF, wherein the second SRF is generated by resetting contents of the first SRF following transmission of the second subscriber SDF; and
       receive, in a fourth discovery window subsequent to the third discovery window, one or more second solicited publisher SDFs from at least one of the one or more neighboring wireless stations.

11. The apparatus of claim 10,
    wherein the first SRF comprises a data structure indicating one or more medium access control (MAC) addresses of the one or more neighboring wireless stations.

12. The apparatus of claim 11,
    wherein the data structure comprises at least one of:
       a Bloom filter representative of the one or more MAC addresses; or
       a list of the one or more MAC addresses.

13. The apparatus of claim 10,
    wherein the at least one processor is further configured to:
       receive, from at least one neighboring wireless station of the one or more neighboring wireless stations, an unsolicited publisher SDF in a subsequent discovery window, wherein a MAC address of the at least one neighboring wireless station is indicated by the first SRF.

14. The apparatus of claim 13,
wherein the unsolicited publisher SDF includes an update to service specific information, and wherein the unsolicited publisher SDF further includes an incremented service update indicator.

15. The apparatus of claim 10,
wherein the specified period of time comprises at least two discovery window intervals, and wherein a discovery window interval is defined by at least one of:
a number of time units between successive discovery windows;
a number of time slots between successive discovery windows, wherein a time slot represents a number of time units; or
a number of time blocks between successive discovery windows, wherein a time block represents a number of time slots, and wherein a number of time slots represents a number of time units.

16. A non-transitory computer readable memory medium storing program instructions executable by processing circuitry to cause a wireless station to:
receive, in a first discovery window, one or more first solicited publisher SDFs from one or more neighboring wireless stations, wherein the one or more first solicited publisher SDFs are received subsequent to a first subscriber SDF transmitted at a start of the first discovery window, wherein one or more first solicited publisher SDFs are received according to a peer-to-peer transmission protocol;
transmit, in a subsequent second discovery window, a first service response filter (SRF) in a second subscriber SDF, wherein the first SRF is determined at least in part on the one or more received first solicited publisher SDFs, and wherein the first SRF indicates that the one or more neighboring wireless stations are to suppress responses to the second subscriber SDF in one or more subsequent discovery windows, and wherein the second subscriber SDF is transmitted according to the peer-to-peer transmission protocol;
transmit according to the peer-to-peer transmission protocol, in a third discovery window after a specified period of time following transmission of the second subscriber SDF, a second SRF in a third subscriber SDF, wherein the second SRF indicates that the one or more neighboring wireless stations are to respond to the third subscriber SDF, wherein the second SRF is generated by resetting, following transmission of the second subscriber SDF, contents of the first SRF, and wherein the specified period of time is at least two discovery window intervals; and receive, in a fourth discovery window subsequent to the third discovery window, one or more second solicited publisher SDFs from at least one of the one or more neighboring wireless stations, wherein the one or more second solicited publisher SDFs are received according to the peer-to-peer transmission protocol.

17. The non-transitory computer readable memory medium of claim 16,
wherein the peer-to-peer transmission protocol comprises a protocol specified by a version of the Neighbor Awareness Networking (NAN) standard.

18. The non-transitory computer readable memory medium of claim 16,
wherein a discovery window interval is defined by at least one of:
a number of time units between successive discovery windows;
a number of time slots between successive discovery windows, wherein a time slot represents a number of time units; or
a number of time blocks between successive discovery windows, wherein a time block represents a number of time slots, and wherein a number of time slots represents a number of time units.

19. The non-transitory computer readable memory medium of claim 16,
wherein the first SRF comprises a data structure indicating one or more medium access control (MAC) addresses of the one or more neighboring wireless stations, and wherein the data structure comprises at least one of:
a Bloom filter representative of the one or more MAC addresses; or
a list of the one or more MAC addresses.

20. The non-transitory computer readable memory medium of claim 16,
wherein the program instructions are further executable to cause the wireless station to:
receive, from at least one neighboring wireless station of the one or more neighboring wireless stations, an unsolicited publisher SDF in a subsequent discovery window,
wherein the unsolicited publisher SDF is received according to the peer-to-peer protocol,
wherein a MAC address of the at least one neighboring wireless station is indicated by the first SRF,
wherein the unsolicited publisher SDF includes an update to service specific information, and
wherein the unsolicited publisher SDF further includes an incremented service update indicator.

* * * * *